June 8, 1937. E. D. MISNER Re. 20,402

REFRIGERATING APPARATUS

Original Filed March 14, 1927 2 Sheets-Sheet 1

INVENTOR.
EDGAR D. MISNER
BY Wheelwright Hubbard & Belknap
ATTORNEYS

June 8, 1937. E. D. MISNER Re. 20,402

REFRIGERATING APPARATUS

Original Filed March 14, 1927 2 Sheets-Sheet 2

INVENTOR.
EDGAR D. MISNER

BY Whittemore Hulbert & Whittemore
W. Beckwith

ATTORNEYS

Reissued June 8, 1937

Re. 20,402

UNITED STATES PATENT OFFICE 20,402

REFRIGERATING APPARATUS

Edgar D. Misner, Detroit, Mich., assignor to Kelvinator Corporation, Detroit, Mich., a corporation of Michigan Original No. 1,918,818, dated July 18, 1933, Serial No. 175,358, March 14, 1927. Renewed October 27, 1932. Application for reissue June 29, 1935, Serial No. 29,092

18 Claims. (Cl. 62—99)

This invention relates generally to refrigerating apparatus of the domestic type and consists of certain novel features of construction, combinations and arrangements of parts as will be more fully described and particularly pointed out in the appended claims.

Figure 1:
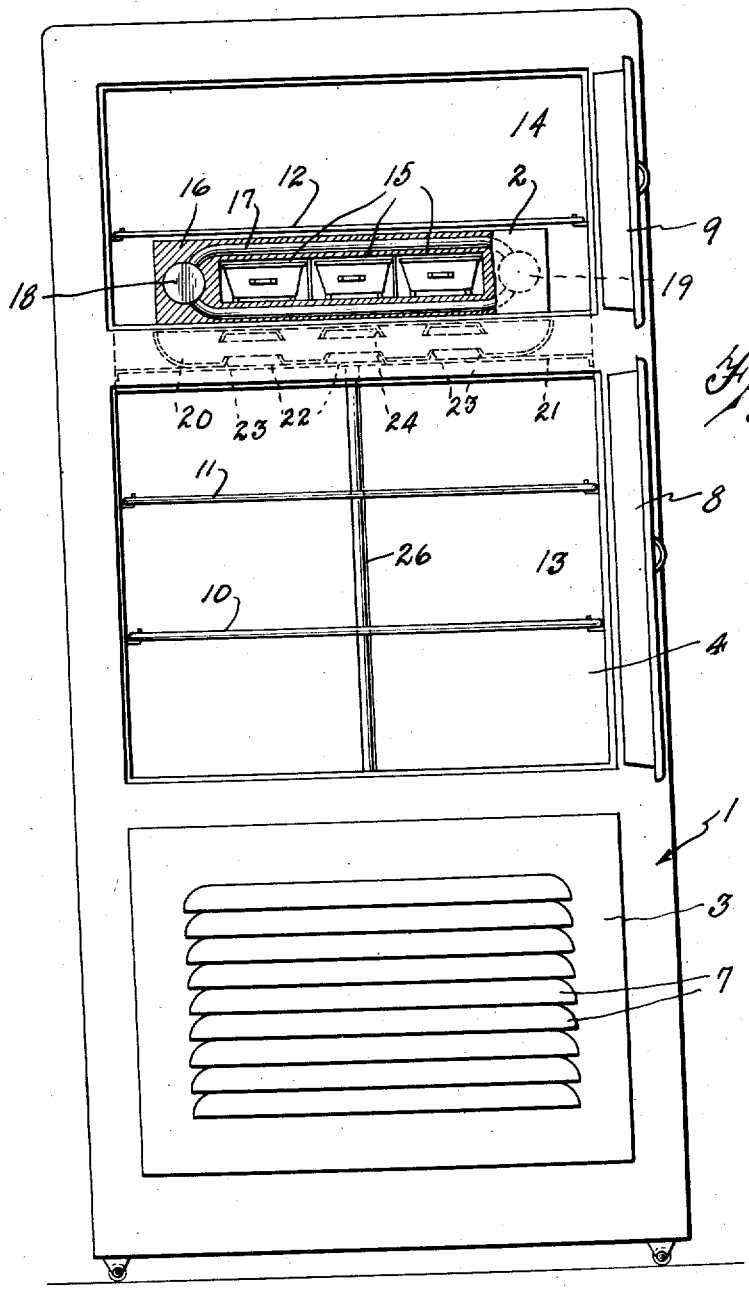
Figure 1 is a front elevation of a refrigerator cabinet and unit embodying my invention.
Figure 2:
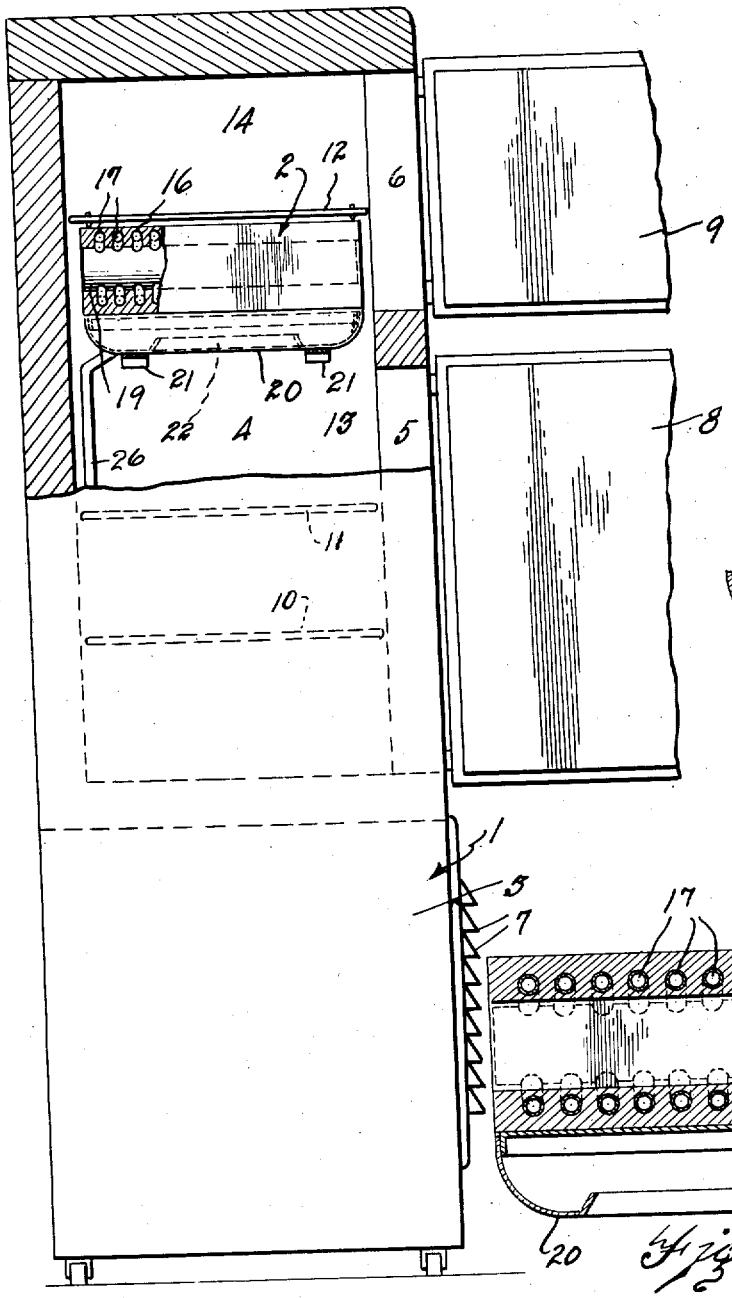
Figure 2 is a fragmentary end elevation thereof.
Figure 4:
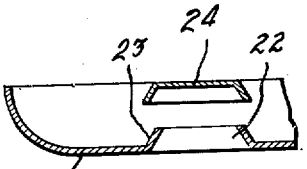
Figure 4 is an enlarged fragmentary sectional view through the pan and one of the shields.
Figure 3:
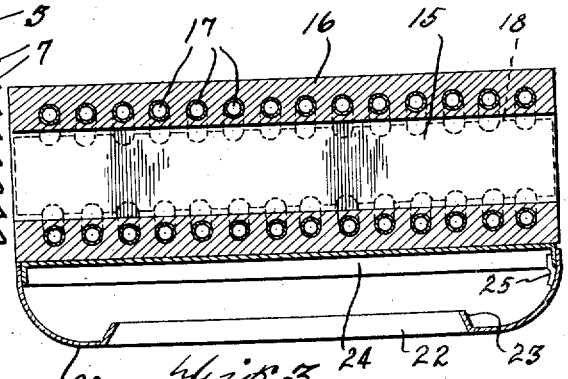
Figure 3 is a fragmentary vertical sectional view through the pan and showing the freezing unit mounted thereon.

Heretofore provision has been made at the upper ends of refrigerating cabinets or ice boxes to receive the brine tanks or freezing units of various types of refrigerating apparatus. In the past such units have been constructed and arranged in such a way that the upper end or a certain corner of the cabinet could be cooled to a very low temperature. Usually the food compartments or chambers were located at a lower level or at a point more or less remote from said unit, hence the foods etc. were not cooled to such a low temperature. With the present invention however, the full benefits of the cooling or freezing unit are obtained in the food chambers for the reason that the unit is located at a lower level or more or less centrally in the cabinet and the food chambers or compartments are located upon opposite sides thereof in direct communication therewith.

Referring now to the drawings, 1 is a refrigerator cabinet, and 2 is a freezing unit of a refrigerating apparatus. As shown, the cabinet 1 is divided longitudinally into two chambers 3 and 4 respectively and is provided at the front thereof with the vertically spaced openings 5 and 6 and a series of louvers 7. As shown, the openings 5 and 6 communicate with the upper chamber 4 while the louvers 7 serve as shields for suitable openings in communication with the lower chamber. Any suitable means such as the doors 8 and 9 respectively may be used to normally close the openings 5 and 6. In use, the marginal portion of the refrigerating apparatus such as a compressor, motor, condenser, etc. (not shown) is located in the lower chamber 3 of the cabinet while the freezing unit 2 of the apparatus is located in the upper chamber 4, preferably at a point in line with the lower edge of the upper opening 6. Thus ample space for foods etc. is provided both above and below the unit 2. While I have shown only two shelves 10 and 11 respectively below and one shelf 12 above the unit 2, it will be apparent any number of such shelves may be used as may be found desirable for supporting the food. In any event the food chambers 13 and 14 are upon opposite sides of the unit 2 and are in direct communication therewith. As shown in the drawings, the shelf 12 is of the removable type and if desired said shelf may be removed and food articles may be placed on the top flat wall of the freezing unit in case it is desired to cool said articles to lower temperatures than ordinarily when placed on shelf 12.

In the present instance the freezing or refrigerating unit 2 is preferably elongated in form and preferably has a series of transversely extending openings 15 for the reception of ice trays or pans and the like. Embedded in the body of heat conducting material 16 of the unit is suitable tubing 17 constituting the expansion coils of the refrigerating apparatus. Preferably this tubing 17 extends longitudinally of the body and is terminally connected to transversely extending headers 18 and 19 respectively. Thus it will be noted that I have provided a substantially flat-like refrigerant evaporator or freezing unit which is horizontally disposed within the interior of the cabinet to divide the interior thereof into two substantially rectangular, vertically spaced food compartments wherein the temperatures will be relatively different. It will also be noted that the refrigerant pipes or duct means 17 extend laterally from the headers and with the aid of the body of heat conducting material form a freezing zone. Also, it will be noted that the pipes extend but slightly above and below the height of the headers.

Located directly below the unit 2 is a pan 20 that preferably rests upon a pair of horizontally spaced bars or brackets 21 that are terminally secured to the sides of the refrigerator cabinet. As shown, the pan 20 is preferably dished in form and is adapted to receive any water dripping or draining from the unit 2. To provide for circulation of air and at the same time prevent the escape of water into the lower chambers, the bottom of the pan is preferably provided with spaced openings 22 having upstanding marginal flanges 23, while covering said openings 22 are spaced inverted trough-shaped shields 24 which in turn are terminally secured, preferably by a welding operation, to the front and rear walls of the pan. If desired the welding operation may be dispensed with and suitable brackets 25 may be provided at the front and rear walls of the pan to support the shields 24. In this connection it will be noted that the pan 20 is supported upon the brackets 21, while the unit 2 is in turn supported upon the shields 24 that are carried by the pan. Incidentally the shields 24 may be any shape desired so as to cover the openings 22 and thereby prevent water dripping through the openings into the lower compartments. Any suitable means such as the drain pipe 26 may be used to carry off water received in said pan.

Thus, from the foregoing description it will be readily apparent that I have provided a freezing unit that is constructed and arranged in such a way in the refrigerating cabinet that relatively large storage spaces for food are provided upon opposite sides of and in direct communication with the unit 2. Moreover provision has been made for the reception and drainage of water from the unit and for the circulation of air about the unit between the upper and lower food chambers.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. The combination with a refrigerator cabinet having a freezing chamber, of a freezing unit of a refrigerating apparatus in said chamber, a pan anchored in the cabinet below said unit to catch water dripping from said unit, the bottom of said pan having an opening for air, and a shield for said opening secured to opposite walls of said pan and constituting a seat for said unit.

2. The combination with a refrigerator cabinet having a freezing chamber, of a freezing unit of a refrigerating apparatus in said chamber, a pan anchored in the cabinet spaced from the side walls thereof and arranged below said unit to catch water dripping from said unit, and means secured to the side walls of said pan for supporting said unit in the cabinet.

3. The combination with a refrigerator cabinet having a freezing chamber, of a freezing unit of a refrigerating apparatus in said chamber, a pan in said cabinet for catching water dripping from said unit, and means for supporting said pan spaced from the side walls of the cabinet including a bracket secured to said cabinet, and means for supporting said unit upon said pan.

4. The combination with a refrigerator cabinet, of a pan in said cabinet having spaced openings for air in its bottom, a support for said pan secured to said cabinet, shields for said openings secured in spaced relation upon said pan, and a freezing unit of a refrigerating apparatus resting on said shields.

5. Refrigerating apparatus comprising, in combination, a cabinet having two openings in the front wall thereof, a flat-like cooling element having a freezing chamber, said cooling element being disposed within said cabinet in such a manner so as to divide the interior thereof into vertically spaced food storage chambers, and doors for closing said openings, said cooling element and said openings being located so that access may be had to at least two of said chambers through one of said openings and access to one of said chambers may be had through the other opening.

6. A refrigerant cooling element for cooling circulating air and for freezing substances, comprising an elongated horizontal header and duct means for circulating refrigerant extending laterally from the header and forming an elongated space for the insertion of an ice making container substantially within the height of the header and on the same horizontal plane as the header.

7. A refrigerant evaporator for cooling circulating air and for freezing substances, comprising an elongated horizontal header and duct means for circulating refrigerant extending laterally from the header and forming an elongated space for the insertion of a plurality of ice making receptacles on the same horizontal plane substantially within the height of the header.

8. A refrigerant evaporator for cooling circulating air and for freezing substances, comprising a pair of elongated horizontal headers disposed on the same horizontal plane and duct means for circulating refrigerant interconnecting said headers and forming an elongated space for the insertion of an ice making container substantially within the height of said headers.

9. A flat-like refrigerant evaporator of the type adapted to be inserted in a cabinet for cooling circulating air therein and having provisions for freezing ice cubes comprising, a body of heat conducting material having a space for receiving an ice making receptacle, an elongated header embedded in said body, and refrigerant duct means embedded in said body and extending laterally from the header above and below said space for said receptacle.

10. A refrigerant evaporator for cooling circulating air and for freezing substances, comprising a pair of spaced apart refrigerant headers disposed in parallel relation on substantially the same horizontal plane and extending from a point adjacent the front of the evaporator to a point adjacent the rear of the evaporator, and refrigerant duct means associated with and interconnecting the under side of each of said headers to provide passages for refrigerant in communication with each of said headers, a refrigerant conduit interconnecting said headers above said duct means, and said evaporator providing a chamber for a freezing tray above the lowermost portion of said duct means and below said refrigerant conduit.

11. In a refrigerating apparatus, a cooling unit including two spaced apart refrigerant headers disposed on substantially the same horizontal plane and extending substantially from the front to the rear of the evaporator, and air cooling and ice freezing means associated with said headers and comprising a continuous imperforate wall structure associated with and extending below and joining said headers, said wall structure being provided with hollow portions for refrigerant communicating with each of said headers, portions of said wall structure being disposed in spaced apart upright planes, and said wall structure having provisions for supporting an ice freezing tray between said upright wall portions.

12. In a refrigerating apparatus, a cooling unit including two spaced apart refrigerant headers disposed on substantially the same horizontal plane and extending substantially from the front to the rear of the evaporator, and air cooling and ice freezing means associated with said headers and comprising a continuous imperforate wall structure associated with and extending below and joining said headers, said wall structure being provided with hollow portions for refrigerant communicating with each of said headers, portions of said wall structure being disposed in spaced apart upright planes, said wall structure having provisions for supporting an ice freezing tray between said upright wall portions, and a refrigerant conduit interconnecting said headers above said freezing tray.

13. In a refrigerating apparatus, a cooling unit including two spaced apart refrigerant headers disposed on substantially the same horizontal plane and extending substantially from the front to the rear of the evaporator, and air cooling and ice freezing means associated with said headers and comprising a continuous imperforate wall structure associated with and extending below and joining said headers, said wall structure being provided with hollow portions for refrigerant communicating with each of said headers throughout substantially the entire length of said headers, portions of said wall structure being disposed in spaced apart upright planes, and said wall structure having provisions for supporting an ice freezing tray between said upright wall portions.

14. A refrigerant evaporator for cooling circulating air and for freezing substances, comprising a pair of spaced apart refrigerant headers disposed in parallel relation on substantially the same horizontal plane and extending at least a portion of the distance between the front and the rear of the evaporator, and air cooling and ice freezing means associated with said headers and comprising a continuous imperforate wall structure extending below and joining said headers, said wall structure being provided with hollow portions for refrigerant below said headers in communication with each of said headers, a refrigerant conduit interconnecting said headers, and said wall structure having provisions for supporting a freezing tray between said wall structure and said refrigerant conduit.

15. An evaporator for refrigerating machines including a flat upper surface for supporting articles to be frozen and a header extending along one edge of the evaporator, said evaporator having a plurality of passages extending from said header to the opposite side of said flat surface for the circulation of refrigerant therethrough and having a passage extending along the edge thereof communicating with the passages extending from said header.

16. An evaporator for refrigerating apparatus comprising imperforate side walls having headers therein, a refrigerated lower wall, providing a flat support for article to be frozen, and a refrigerated wall immediately above said lower wall for providing an additional flat surface for supporting articles to be frozen.

17. An evaporator for refrigerating apparatus comprising imperforate side walls spaced apart in parallel relation and a header for refrigerant associated with each of said side walls, an imperforate bottom wall joined to each side wall and having a passage for refrigerant communicating with said headers and a flat surface for supporting articles to be frozen, and an imperforate wall structure extending between said side walls and having a flat surface for supporting articles and a passage for refrigerant for cooling said articles.

18. An evaporator for refrigerating apparatus comprising imperforate side walls spaced apart in parallel relation and a header for refrigerant formed in one of said side walls, an imperforate bottom wall joined to each side wall and having a passage for refrigerant communicating with said header and a flat surface for supporting articles to be frozen, and an imperforate wall structure extending between said side walls and having a flat surface for supporting articles and a passage for refrigerant for cooling said articles.

EDGAR D. MISNER.